J. W. LEDOUX.
LIQUID METER.
APPLICATION FILED JULY 10, 1913.

1,129,209.

Patented Feb. 23, 1915.

2 SHEETS—SHEET 1.

WITNESSES:

INVENTOR
John W. Ledoux
BY
Chas. N. Butler
ATTORNEY.

J. W. LEDOUX.
LIQUID METER.
APPLICATION FILED JULY 10, 1913.

1,129,209.

Patented Feb. 23, 1915.
2 SHEETS—SHEET 2.

WITNESSES:
Geo. A. Dunney
Jos. S. Denny

INVENTOR
John W. Ledoux
BY
Chas. N. Butler
ATTORNEY.

UNITED STATES PATENT OFFICE.

JOHN W. LEDOUX, OF PHILADELPHIA, PENNSYLVANIA.

LIQUID-METER.

1,129,209.  Specification of Letters Patent.  Patented Feb. 23, 1915.

Application filed July 10, 1913. Serial No. 778,365.

*To all whom it may concern:*

Be it known that I, JOHN W. LEDOUX, a citizen of the United States, residing in the city of Philadelphia, county of Philadelphia, and State of Pennsylvania, have invented certain Improvements in Liquid-Meters, of which the following is a specification.

My invention is a meter designed to measure liquid flowing through a weir and it comprises, in its preferred construction, the combination with a weir, of means for differentiating the pressure due to the differences in depth or head of the liquid flowing therethrough and thereby effecting the movement of a float and the operation of mechanism for indicating the rate and quantity of flow.

The characteristic features of my invention are fully disclosed in the following description and the accompanying drawings in illustration thereof.

Figure 1:
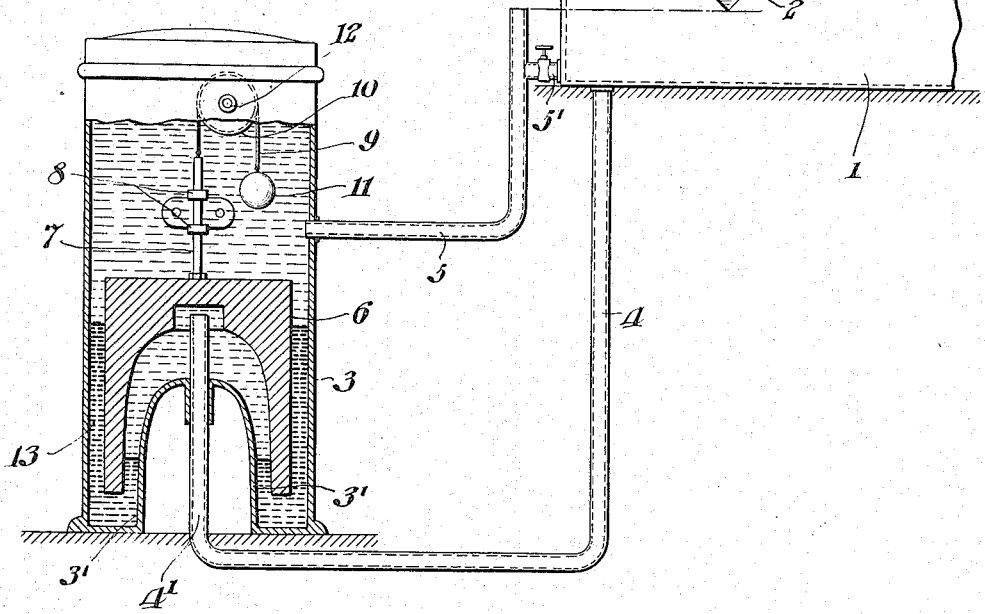
Figures 2, 5:
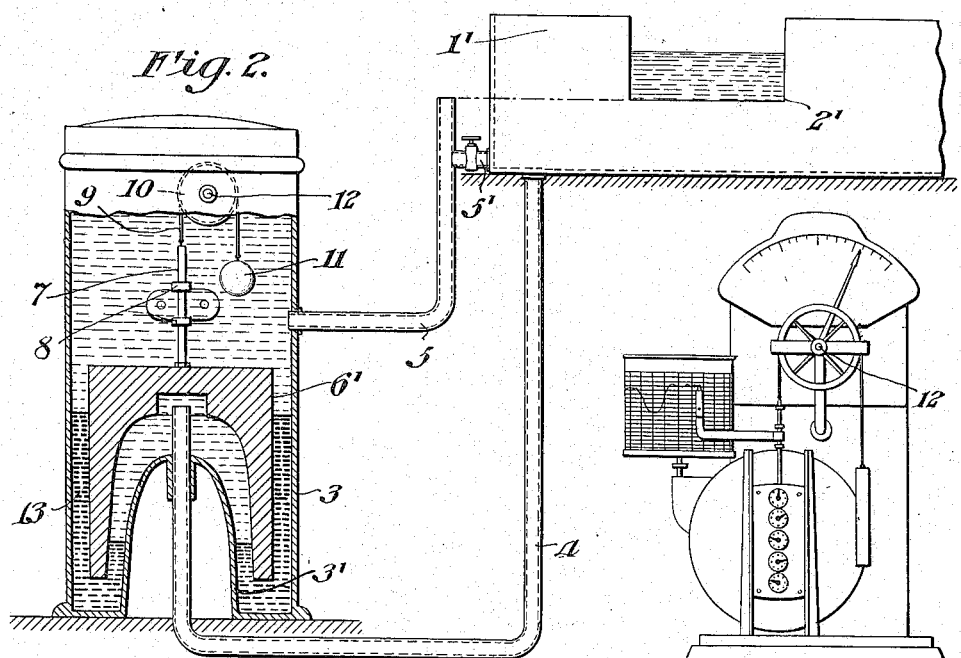
Figure 3:
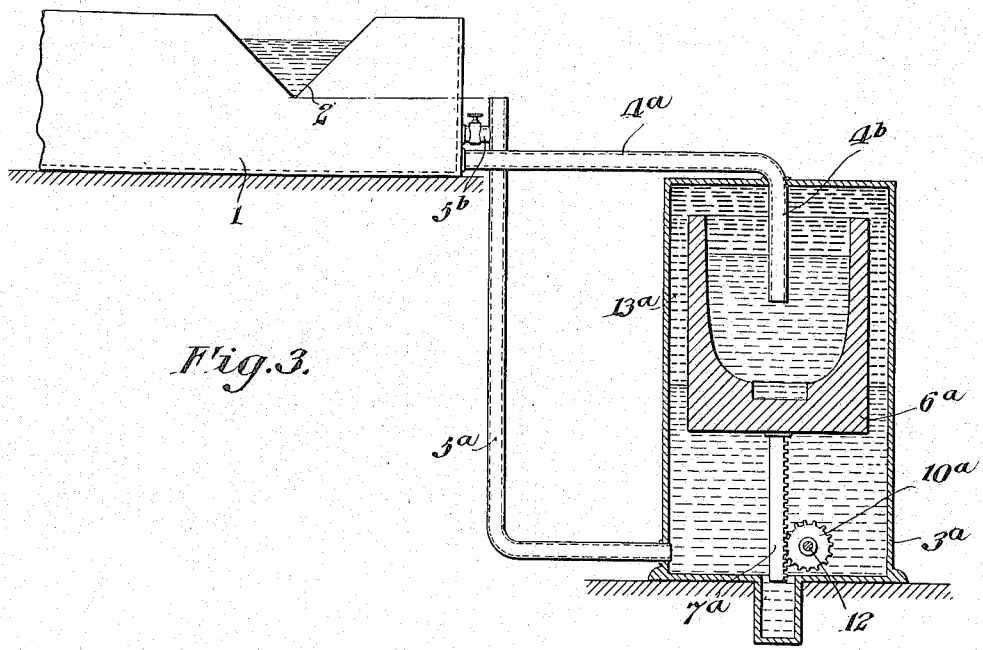
Figure 4:
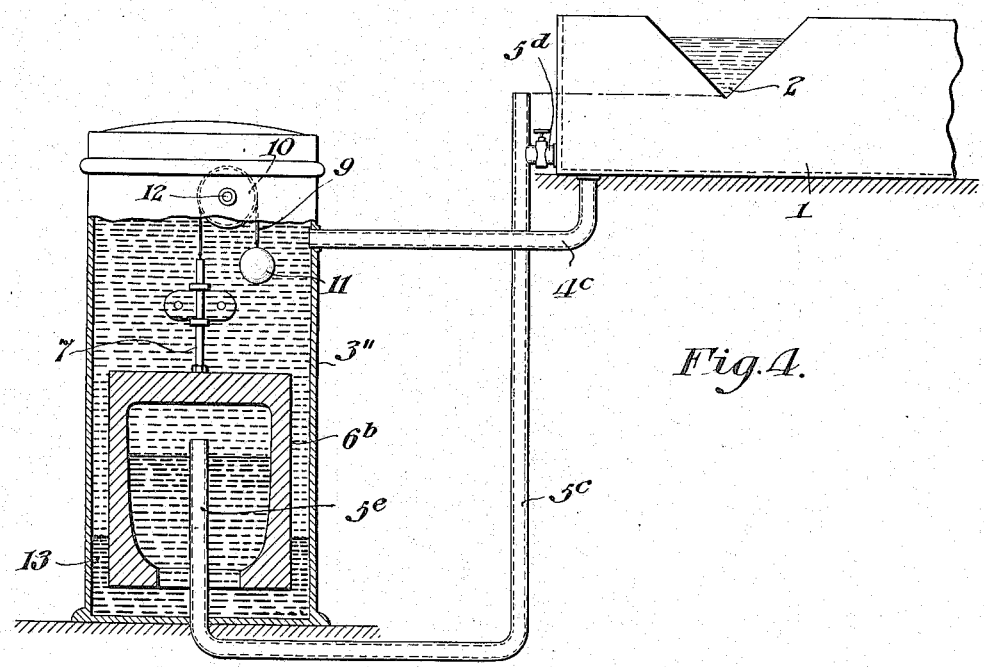

In the drawings, Figure 1 is a part sectional elevation of my improvements applied to a weir of V-shaped cross section; Fig. 2 is a part sectional elevation of the construction applied to a weir of rectangular cross section; Fig. 3 is a part sectional elevation representing a second modification; Fig. 4 is a part sectional elevation representing a third modification; and Fig. 5 is an elevation of a form of mechanism for indicating the rate and quantity.

The mechanism, as illustrated in Fig. 1, comprises an outlet box 1 containing the weir 2 in the form of a V-notch, in combination with a casing 3 connected by a pipe 4 with the box 1 at a point below the bottom of the weir and by a pipe 5 connected with the box below the level of the weir by a coupling 5', the pipe 5 having an open end at the level of the bottom of the weir.

The casing 3 contains the hollow float 6 connected with the rod 7 which is movable vertically in the guides 8 and connected with the cord 9 passing over a sheave 10 to a counter balancing weight 11, the sheave being fixed on the indicator shaft 12 journaled in the casing.

The pipe 4 has the vertical section 4' which extends upwardly through the bottom of the casing 3 and the stationary displacing device 3' therein, so as to communicate with the interior of the float 6. A body of auxiliary liquid, of different specific gravity from that to be measured, is contained in the casing 3, and in this auxiliary liquid the float 6 is immersed to a greater or less depth depending upon the depth of the liquid to be measured, flowing through the weir 2. When the surface of the liquid in the box 1 is level with the top of the pipe 5 and the bottom of the weir 2 so that the pressures transmitted through the pipes 4 and 5 to the interior and exterior of the float 6 are equal, such float is submerged to its greatest depth. When the liquid flowing through the weir rises to its greatest elevation, the pressure transmitted through the pipe 4 is greatest, the pressure in the pipe 5 remaining constant, and the float rises to its greatest elevation due to the resultant or difference in pressure.

The cross section of the float 6, subject to submergence in the auxiliary liquid, is of such character that in its lowest position, when there is no flow through the weir, the level of the auxiliary liquid in the casing 3, within and without the float, is the same, and, as the depth of the liquid flowing through the weir increases, the float 6 rises a distance which is proportionate to the increase in the quantity of flow, so that the elevation of the float will indicate the quantity flowing, the cross sections of the float bearing a functional relation to those of the weir.

As shown in Fig. 2, the box 1' is provided with a notch or weir 2', of rectangular cross section, and the casing 3, connected with the box by pipes 4, 5, and 5', contains the hollow float 6' which is connected with the rod 7 movable in guides 8, the rod being connected with the cord 9 passing over the sheave 10 to the weight 11, and the sheave being fixed on the indicator shaft 12 journaled in the casing.

The cross sections of the hollow float 6', subject to submergence in the heavier liquid 13, bear a functional relation to the cross sections of the weir 2', so that the distance of the float's movement in such liquid shall be proportionate to the increase in the quantity of liquid flowing through the weir. The float is at its lowest position of greatest submergence with the heavier liquid interior and exterior thereto at a common level when there is no flow through the weir, and it rises from its lowest position as the pressure communicated through the pipe 4 increases, with the rise of the liquid in the weir, the pressure communicated through the pipe 5 remaining constant.

As illustrated in Fig. 3, the box 1, containing the weir 2, is connected, at a point below the weir, with the casing 3ª, by a pipe 4ª having a section 4ᵇ extending downwardly into the casing and by a pipe 5ª having a branch 5ᵇ, the top of the pipe 5ª being open at the level of the bottom of the weir. A recessed float 6ª, movable in the casing 3ª, is connected by a rack 7ª with the pinion 10ª which is fixed on the journaled shaft 12, the chamber containing a liquid 13ª, as oil, lighter than the liquid to be measured. The cross sections of the float 6ª movable in the oil 13ª (which is held in the top of the casing 3' by the heavier liquid communicated through the pipes 4ª and 5ª) are of such character that the float will move downwardly from its highest position (when there is no flow through the weir and the pressures communicated through the pipes 4ª and 5ª are equal) a distance proportional to the quantity of liquid flowing through the weir.

As illustrated in Fig. 4, the box 1, having the weir 2, is connected, at a point below the weir, with the casing 3'', by a pipe 4ᶜ and a pipe 5ᶜ having a branch 5ᵈ joined to the box and a section 5ᵉ extending into the casing, the top of the pipe 5ᶜ being open so as to discharge at the level of the bottom of the weir.

A hollow float 6ᵇ, into which the section 5ᵉ extends, is connected through the rod 7 with the cord 9 which passes over the sheave 10 to the counter weight 11, the sheave being fixed on the journaled shaft 12. A liquid 13, heavier than that to be measured, is contained in the casing 3'' and buoys the float 6ᵇ, which is at its highest elevation when there is no flow through the weir, the pressures communicated through the pipes 4ᶜ and 5ᶜ being equal, and at its lowest elevation when the quantity flowing through the weir is greatest, the float moving downwardly with the increase of pressure communicated through the pipe 4ᶜ over the constant pressure communicated through the pipe 5ᶜ. The cross sections of the float are of such character that the distance it moves is proportionate to the change in the quantity of liquid flowing through the weir.

The movement of the shaft 12 by the corresponding float operates a known form of indicating mechanism adapted for showing the rate and quantity of the flowing liquid.

The mathematical design of the device is determined as follows: It is known that the quantity of water passing over the weir is proportional to the 2.5th power of the head, where the weir is triangular, and where the weir is rectangular the flow over the same is proportional to the 1.46th power of the head.

By the invention, the movement of the float is also proportional, for the triangular weir, to the 2.5th power of the head, and, where the weir is rectangular, to the 1.46th power of the head. As the volume of the auxiliary liquid above or below the given datum is equal to the volume of the float above or below the same datum, by means of the differential calculus it is proven that for the triangular weir, where the variable portion of the float is on the inside, the formula becomes:

$$Y = \sqrt{\dfrac{A}{B + \dfrac{1}{X^{0.6}}}}$$

and where the variable portion of the float is on the outside, becomes:

$$Y = \sqrt{A + \dfrac{B}{X^{0.6}}}$$

and for the rectangular weir, where the variable portion is on the inside, becomes:

$$Y = \sqrt{\dfrac{A}{B + \dfrac{1}{X^{0.3152}}}}$$

and where the variable portion is on the outside becomes:

$$Y = \sqrt{A + \dfrac{B}{X^{0.3152}}}$$

where Y is the radius of the variable portion of the float and X is the movement of the float above or below a given datum and where A and B are constants.

Having described my invention, I claim:

1. In a meter, the combination with a weir, of a casing, a pipe connecting said casing with the liquid flowing over said weir at a point below the same, means comprising a pipe connected with the casing by which a constant pressure is communicated to the latter, a hollow float movable in said casing, and a sealing liquid in said casing separating the liquid introduced through said pipes, said sealing liquid being of different specific gravity from said first named liquid and regulating the movement of said float.

2. The combination of a casing, a hollow float movable in said casing, a sealing liquid in said casing in which said float is adapted to be immersed, means for communicating constant pressure to said casing exterior to said float, means for conveying a different pressure which is a function of the head of the liquid to be measured to said casing within said float, and means for indicating the movement of said float, said sealing liquid being of different specific gravity from said second liquid.

3. The combination with a device containing a weir, of a casing, a float movable in said casing, a liquid heavier than that to be measured in said casing in which said float is movable, and means comprising conduits connecting said device with said casing whereby liquid introduced to said casing through said conduits is separated by said heavier liquid, and said conduits communicate different pressures to the interior of said casing and having a resultant which is a function of the depth of the liquid in the weir.

4. The combination of a device having a weir for discharging liquid to be measured, a casing containing a liquid heavier than that in said device, a float movable in said casing, said float containing a recess sealed by said heavier liquid, and conduits connecting said device with said casing interior and exterior to said float, said conduits being connected with said device below said weir and one of said conduits being adapted to discharge so that a constant pressure is communicated to said casing therethrough.

5. The combination of a liquid conduit provided with a weir, a casing, ducts connecting said conduit with the interior of said casing, one of said ducts being adapted to discharge at a predetermined level above its connection with said casing, a sealing liquid in said casing of different specific gravity from said first named liquid, and a hollow float movable in and sealed by said sealing liquid and indicating mechanism operated by said float, said float having variable cross sections bearing a functional relation to the cross sections of said weir and one of said ducts extending into said float so as to be separated by said sealing liquid from the other of said ducts.

6. In a meter, the combination with a liquid conduit having a triangular weir, of a casing, a duct connecting said conduit with said casing whereby pressures are communicated to said casing variable with variations in the depth of liquid in said weir, a second duct for communicating pressure to said casing, a liquid in said casing of different specific gravity from that in said conduit, and means comprising a float movable under control of said liquid in said casing by the differentials of the pressures communicated through said ducts, said float being a figure of revolution and having a radius which is a function of the six-tenth power of the movement of said float, whereby the movement of said float is directly proportional to the flow through said conduit.

In testimony whereof I have hereunto set my name this 8th day of July, 1913, in the presence of the subscribing witnesses.

JOHN W. LEDOUX.

Witnesses:
Jos. G. Denny, Jr.
C. N. Butler.